(12) United States Patent
Kim et al.

(10) Patent No.: US 9,170,687 B2
(45) Date of Patent: Oct. 27, 2015

(54) DISPLAY DEVICE INCLUDING SENSOR

(75) Inventors: Chul Kim, Jeollanam-do (KR); Ji Woong Kim, Jeonju-si (KR); Su Bin Park, Incheon (KR); Byoung Jun Lee, Asan-si (KR); Seung Hwan Moon, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 295 days.

(21) Appl. No.: 13/477,247

(22) Filed: May 22, 2012

(65) Prior Publication Data

US 2013/0169587 A1    Jul. 4, 2013

(30) Foreign Application Priority Data

Jan. 4, 2012  (KR) .................. 10-2012-0001162

(51) Int. Cl.
*G06F 3/044*   (2006.01)
*G06F 3/041*   (2006.01)

(52) U.S. Cl.
CPC .............. *G06F 3/044* (2013.01); *G06F 3/0412* (2013.01)

(58) Field of Classification Search
CPC ................................. G06F 3/044; G06F 3/047
USPC ...................... 345/173–178; 178/18.01–20.01
See application file for complete search history.

(56) References Cited

U.S. PATENT DOCUMENTS

| 2008/0129898 | A1* | 6/2008 | Moon .......................... 349/12 |
| 2009/0273572 | A1 | 11/2009 | Edwards et al. |
| 2010/0214262 | A1 | 8/2010 | Ishizaki et al. |
| 2010/0328268 | A1 | 12/2010 | Teranishi et al. |
| 2011/0050631 | A1 | 3/2011 | Kwon et al. |
| 2011/0157043 | A1* | 6/2011 | Lai et al. ...................... 345/173 |
| 2011/0157079 | A1 | 6/2011 | Wu et al. |
| 2011/0187676 | A1 | 8/2011 | Chang et al. |
| 2011/0187677 | A1* | 8/2011 | Hotelling et al. ............ 345/174 |
| 2012/0133858 | A1* | 5/2012 | Shin et al. ...................... 349/59 |

FOREIGN PATENT DOCUMENTS

| JP | 2010244357 | 10/2010 |
| JP | 2011086149 | 4/2011 |
| KR | 1020080007812 | 1/2008 |
| KR | 1020100070964 | 6/2010 |
| KR | 1020110060338 | 6/2011 |
| KR | 1020110078789 | 7/2011 |

\* cited by examiner

*Primary Examiner* — Quan-Zhen Wang
*Assistant Examiner* — Chad Dicke
(74) *Attorney, Agent, or Firm* — Cantor Colburn LLP

(57) ABSTRACT

A display device includes: a first display panel; a second display panel opposite to the first display panel; and an electro-optical active layer between the first display panel and the second display panel, wherein the first display panel includes a thin film transistor including a gate electrode, a source electrode, a drain electrode and a semiconductor layer, a gate line configured to transmit a gate signal to the gate electrode of the transistor and extending in a first direction, and a sensing electrode extending in the first direction and overlapping the gate line, where the sensing electrode and the gate electrode define a capacitor.

19 Claims, 8 Drawing Sheets

DISPLAY DEVICE INCLUDING SENSOR

This application claims priority to Korean Patent Application No. 10-2012-0001162, filed on Jan. 4, 2012, and all the benefits accruing therefrom under 35 U.S.C. §119, the content of which in its entirety is herein incorporated by reference.

BACKGROUND (a) Field

A display device including a sensor is provided.

(b) Description of the Related Art

A display device may include a flat panel display device, such as a liquid crystal display ("LCD"), an organic light emitting display, e.g., organic light emitting diode ("OLED") display, and an electrophoretic display, typically includes a plurality of pairs of field generating electrodes and an electro-optical active layer. The LCD typically includes a liquid crystal layer as the electro-optical active layer, and the organic light emitting display includes an organic light emitting layer as the electro-optical active layer. One of the pair of electric field generating electrodes is generally connected to a switching element to receive an electric signal, and the electro-optical active layer converts the electric signal into an optical signal to display an image.

The display device may further have a touch sensing function for an interaction with a user, based on which an image may be displayed. The touch sensing function typically detects a touch on a screen and touch position information thereof by sensing a change of pressure or light that occurs on the screen in the display device when a user contacts a finger or a touch pen to the screen to write a character or to draw a picture.

In general, a touch sensing method may be divided into a resistive type, a capacitive type and an electro-magnetic ("EM") type, for example.

The display device using the capacitive type typically includes a film including a transparent electrode for touch sensing, and a change of the capacitance, which occurs when a conductor such as a finger provides a contact while the voltage is applied to the transparent electrode, is sensed to detect the contact existence and the contact position.

SUMMARY

In an exemplary embodiment, a display device includes: a first display panel; a second display panel opposite to the first display panel; and an electro-optical active layer between the first display panel and the second display panel, where the first display panel includes a thin film transistor including a gate electrode, a source electrode, a drain electrode and a semiconductor layer, a gate line configured to transmit a gate signal to the gate electrode of the transistor and extending in a first direction, and a sensing electrode extending in the first direction and overlapping the gate line, where the sensing electrode and the gate electrode define a capacitor.

In an exemplary embodiment, the first display panel may include a plurality of gate lines extending in the first direction and a plurality of sensing electrodes extending in the first direction, and the number of a plurality of sensing electrodes may be less than the number of a plurality of gate lines.

In an exemplary embodiment, the plurality of sensing electrodes may include a first sensing electrode and a second sensing electrode neighboring the first sensing electrode, where at least n gate lines of the gate lines may be positioned between the first sensing electrode and the second sensing electrode, and n may be a natural number.

In an exemplary embodiment, the sensing electrode may be connected to a charge amplifier.

In an exemplary embodiment, the charge amplifier may include a non-inversion terminal which is grounded, an inversion terminal connected to the sensing electrode, and an output terminal, and a capacitor may be connected between the inversion terminal and the output terminal.

In an exemplary embodiment, a plane shape of the gate line and the gate electrode may be substantially the same as the plane shape of the sensing electrode.

In an exemplary embodiment, the sensing electrode may include a transparent conductive material.

In an exemplary embodiment, the sensing electrode may have a single-layer structure.

In an exemplary embodiment, the first display panel may include a plurality of gate lines extending in the first direction and a plurality of sensing electrodes extending in the first direction, and a sensing signal line connected to the plurality of sensing electrodes, where the plurality of sensing electrodes may be connected to each other by the sensing signal line.

In an exemplary embodiment, the first display panel may include a plurality of touch sensor units disposed substantially in a matrix shape, and the plurality of touch sensor units may be connected by the sensing signal line.

In an exemplary embodiment, the display device may further include a touch signal processor connected to the sensing signal line and configured to process the sensing signal.

In another exemplary embodiment, a display device includes: a plurality of gate lines configured to transmit a gate signal, where the plurality of gate lines includes a plurality of gate electrodes, and the plurality of gate lines extends in a first direction; and a touch sensor unit configured to capacitively sense a touch, where the touch sensor unit including a plurality of sensing electrodes configured to define a plurality of capacitances along with the plurality of gate electrodes, and the plurality of sensing electrodes extending in a first direction, where the number of the plurality of sensing electrodes is less than the number of the plurality of gate lines.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
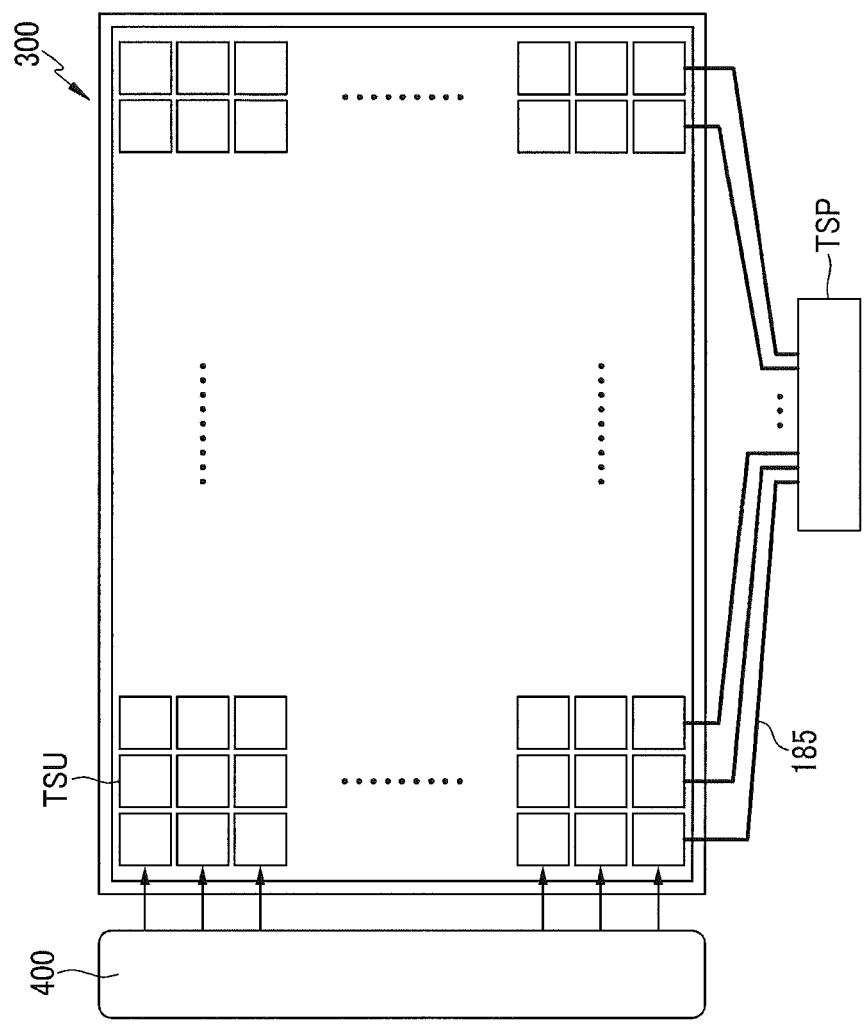
FIG. 1 is a block diagram of an exemplary embodiment of a display device including a sensor according the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of a display device including a sensor according to the invention will be described in detail with reference to FIGS. 1 to 6.

Figure 2:
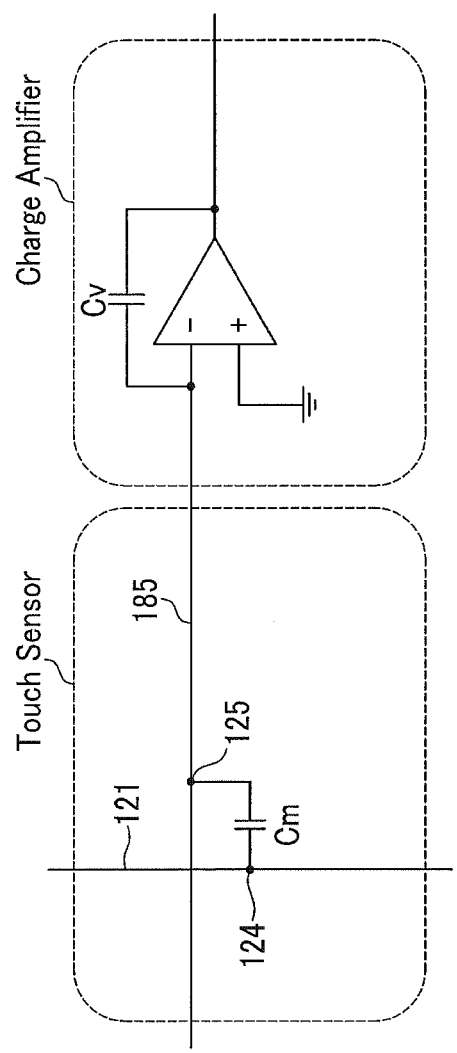
FIG. 2 is a circuit diagram of an exemplary embodiment of a sensor in a display device according to the invention.
Figure 3:
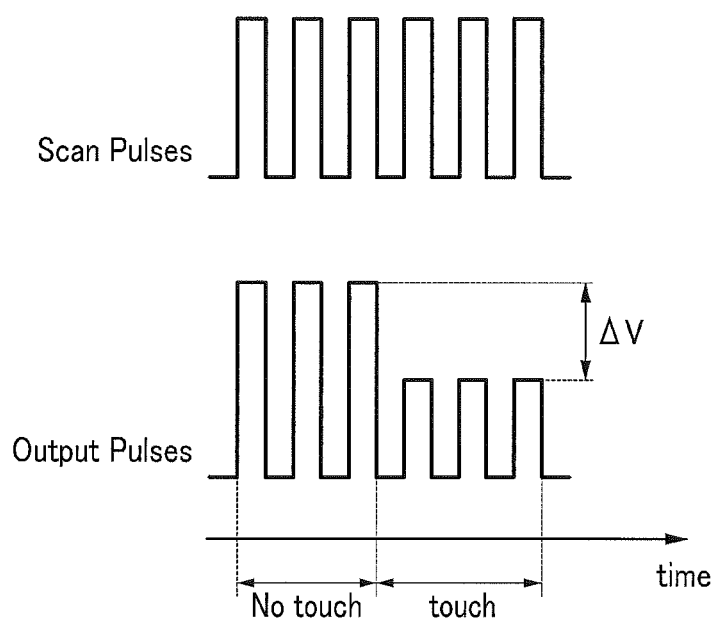
FIG. 3 is a waveform diagram of an exemplary embodiment of signals of a sensor in a display device according to the invention.

FIG. 1 is a block diagram of an exemplary embodiment of a display device including a sensor according to the invention, FIG. 2 is a circuit diagram of an exemplary embodiment of a sensor in a display device according to the invention, and FIG. 3 is a waveform diagram of an exemplary embodiment of signals of a sensor in a display device according to the invention.

Referring to FIG. 1, a display device includes a display panel assembly 300 including a plurality of touch sensor units TSU arranged substantially in a matrix shape, a gate driver 400 which applies a gate signal to the display panel assembly 300, and a touch signal processing unit TSP which processes a sensed signal through a plurality of touch sensor units TSU. The plurality of touch sensor units TSU are connected to the touch signal processor TSP through a plurality of sensing signal lines 185. In an exemplary embodiment, as shown in FIG. 2, each of the sensing signal lines 185 is connected to a sensing electrode 125.

The display panel assembly 300 includes a plurality of signal lines (not shown) and a plurality of pixels (not shown) connected to the signal lines and arranged substantially in a matrix shape. The display panel assembly 300 may include a display panel, such as a liquid crystal display panel, an organic light emitting diode display panel, a plasma display panel and an electrophoretic display panel, for example. In an exemplary embodiment, the display panel assembly 300 may include a light source.

Referring to FIGS. 1 to 3, the signal lines include a plurality of gate lines 121 that transmits a gate signal (referred to as "a scanning signal") and a plurality of data lines (not shown) that transmits a data voltage. In an exemplary embodiment, a pixel connected to a corresponding gate line 121 and a corresponding data line displays one of the primary colors such that a color is displayed by a spatial sum of the primary colors (spatial division). In an alternative exemplary embodiment, a plurality of pixels temporally alternately displays different primary colors such that a color is displayed by a temporal sum of the primary colors (temporal division).

The gate driver 400 is connected to the gate lines 121 of the display panel assembly 300 to apply gate signals having a gate-on voltage and a gate-off voltage, which may be received from an outside, to the gate lines 121. In an exemplary embodiment, each of the gate lines 121 includes a gate electrode 124.

The touch sensor unit TSU capacitively senses a touch thereon and includes the sensing electrode 125. In one exemplary embodiment, for example, the size of the touch sensor unit TSU may be about 4 millimeters (mm) by about 4 millimeters (mm). The touch sensor unit TSU receives the gate signal applied through the gate lines 121 and the gate electrode 124 from the gate driver 400 as a scan pulse for touch sensing. The gate electrode 124 and the sensing electrode 125 define a capacitor Cm. In an exemplary embodiment, when an external conductor, such as a finger, is disposed substantially close to the sensing electrode 125, a capacitance of the capacitor Cm of the touch sensor unit TSU is changed, and the change of the capacitance of the capacitor Cm of the touch sensor unit TSU is processed in the touch signal processor TSP. The sensing electrode 125 is connected to a charge amplifier, and the charge amplifier changes the charge amount into a voltage. In an exemplary embodiment, a non-inversion terminal (+) of the charge amplifier is grounded, an inversion terminal (−) of the charge amplifier is connected to the sensing electrode 125, an output terminal of the charge amplifier is connected to an analog-digital converter ("ADC") (not shown), and the ADC is connected to the touch signal processor TSP. In such an embodiment, the charge amplifier may include a capacitor Cv connected between the inversion terminal (−) and the output terminal of the charge amplifier.

Referring to FIG. 3, the gate electrode 124 is applied with the scan pulse, and a magnitude of the output voltage pulse (also referred to as a sensing signal), e.g., amplitude of the voltage pulse, output through the charge amplifier from the sensing electrode 125 is changed based on the touch by the external conductor. The magnitude of the output voltage pulse under the touch is less than the magnitude of the output voltage pulse when the touch does not exist, and the voltage difference ΔV is substantially proportional to a change of the capacitance of the capacitor Cm of the touch sensor unit TSU due to the touch. In an exemplary embodiment, as the magnitude of the change of the capacitance of the capacitor Cm, which is decreased by the touch, increases, the magnitude ΔV of the reduced output voltage pulse increases, and the sensitivity of the sensor is thereby improved.

Figure 4:
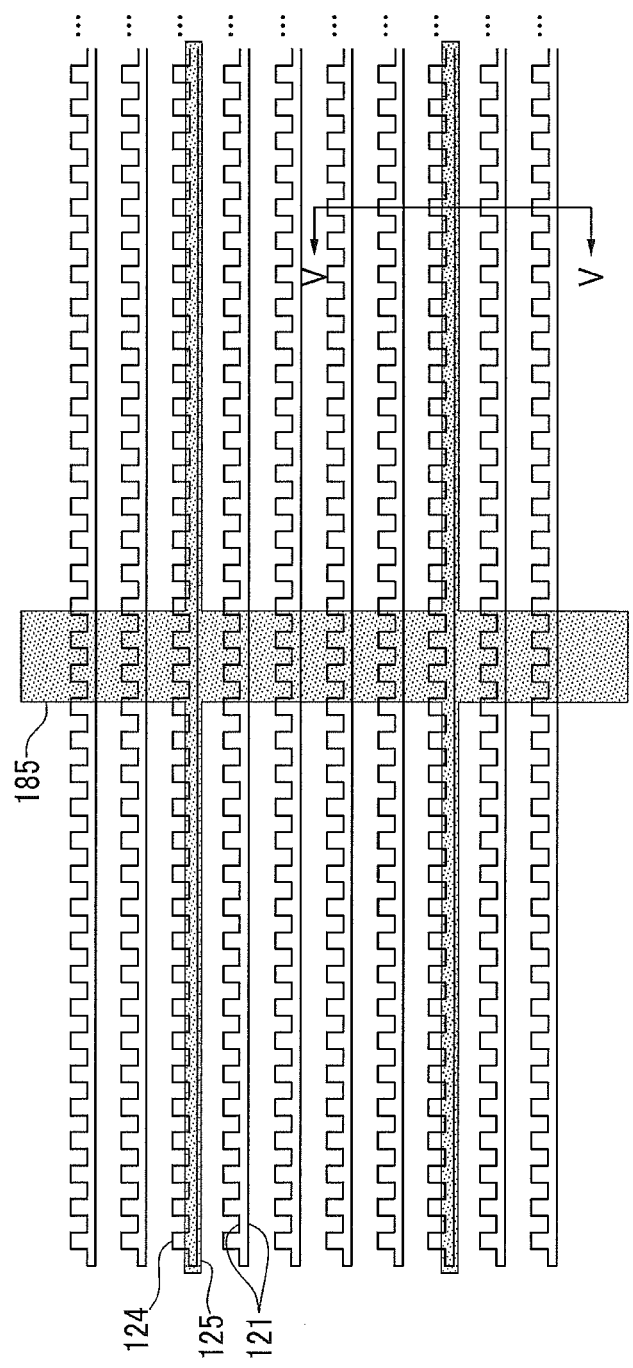
FIG. 4 is a top plan view of an exemplary embodiment of a touch sensor unit in a display device according to the invention.
Figure 5:
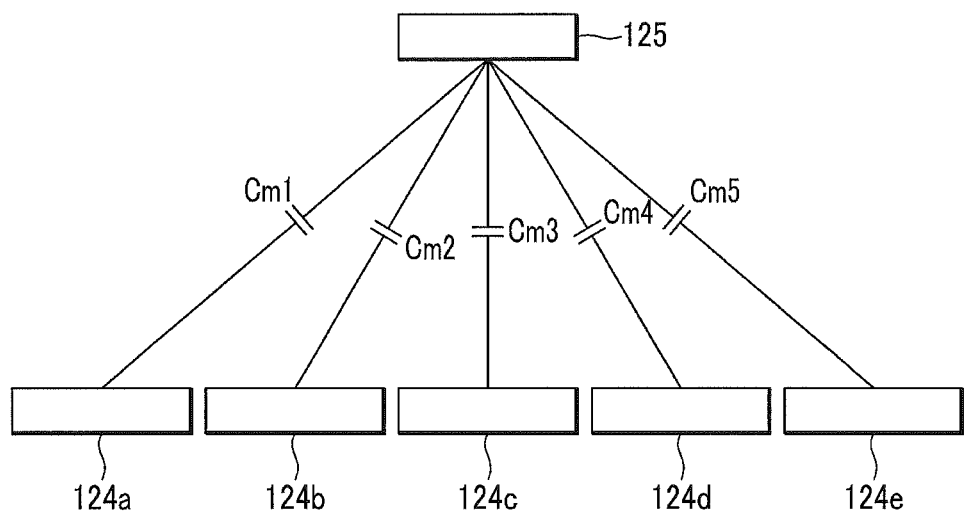
FIG. 5 is a cross-sectional view taken along line V-V of the touch sensor unit of FIG. 4.

FIG. 4 is a top plan view of an exemplary embodiment of a touch sensor unit TSU in a display device according to the invention, and FIG. 5 is a cross-sectional view taken along line V-V of the touch sensor unit of FIG. 4.

Referring to FIG. 4, the gate lines 121 extend substantially in a row direction and are substantially parallel to each other. The sensing electrodes 125 extend substantially in the row direction and overlapping the gate lines 121. The plurality of sensing electrodes 125 are substantially parallel to each other, and the number of sensing electrodes 125 is less than half of the number of gate lines 121. In one exemplary embodiment, for example, the number of sensing electrodes 125 may be ⅕ of the number of gate lines 121, and one sensing electrode of the sensing electrodes 125 may correspond to five gate lines 121, that is, the sensing electrodes 125 are in a one-to-five correspondence with the gate lines 121. In an exemplary embodiment, two neighboring sensing electrodes 125 may overlap an n-th gate line 121 and an (n+5)-th gate line 121, respectively, where n is a natural number. In such an embodiment, the capacitance of the capacitor Cm may further decrease by the external conductor, such as the finger, and the magnitude ΔV of the decreased output voltage pulse may be greater such that the sensitivity of the sensor is substantially improved. In one exemplary embodiment, for example, the capacitance of the capacitor Cm when the touch does not exist is about 19.15 femtofarads (fF), the capacitance when the touch does exist is about 13.47 fF, and the change amount of the capacitance may be about 30% of the capacitance when the touch does not exist, and as a result, the sensitivity of the sensor may be improved.

Referring to FIG. 5, each of the gate line 121 is connected to the gate electrodes, e.g. first to fifth gate electrodes 124a, 124b, 124c, 124d and 124e, and the gate electrodes 124a, 124b, 124c, 124d and 124e defines a plurality of capacitors, e.g., first to fifth capacitors Cm1, Cm2, Cm3, Cm4 and Cm5, respectively, along with the sensing electrode 125 via an insulator interposed therebetween. In an exemplary embodiment, the capacitances of the first to fifth capacitors Cm1, Cm2, Cm3, Cm4 and Cm5 are substantially the same as each other. In one exemplary embodiment, for example, the capacitances of the first to fifth capacitors Cm1, Cm2, Cm3, Cm4 and Cm5 may have a deviation of less than about 10%.

Figure 6:
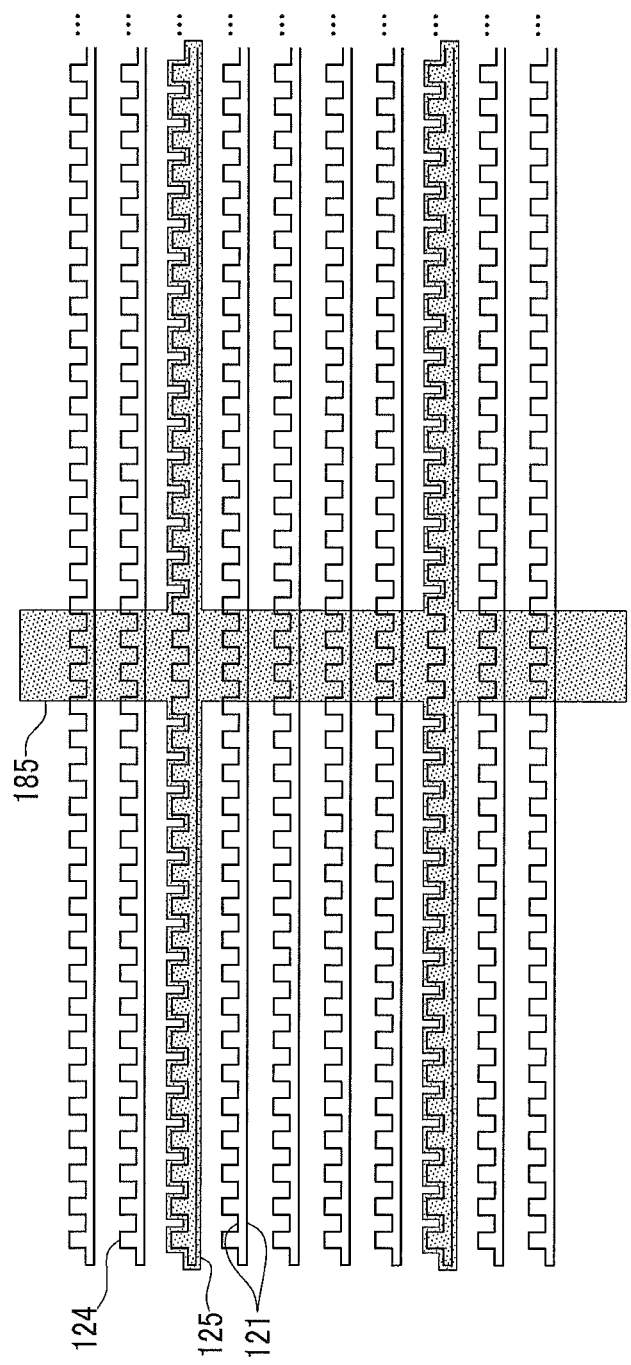
FIG. 6 is a top plan view of an alternative exemplary embodiment of a touch sensor unit in a display device according to the invention.

FIG. 6 is a top plan view of an alternative exemplary embodiment of a touch sensor unit TSU in a display device according to the invention.

Referring to FIG. 6, the sensing electrode 125 overlaps the gate electrode 124. In an exemplary embodiment, as shown in FIG. 6, a plane shape of the sensing electrode 125 may be substantially the same as the plane shape of the gate line 121 including the gate electrode 124. In such an embodiment, the number of sensing electrodes 125 may be less than half of the number of gate lines 121. In one exemplary embodiment, for example, the number of sensing electrodes 125 may be ⅕ of the number of gate lines 121, and one sensing electrode 125 may correspond to five gate lines 121. In an exemplary embodiment, two neighboring sensing electrodes 125 may overlap the n-th gate line 121 and the (n+5)-th gate line 121, respectively, where n is a natural number. In such an embodiment, the capacitance of the capacitor Cm may further decrease by the external conductor, such as the finger, and the magnitude ΔV of the decreased output voltage pulse may be greater such that the sensitivity of the sensor is substantially improved. In one exemplary embodiment, for example, the capacitance of the capacitor Cm when the touch does not exist is about 20.13 fF, the capacitance when the touch does exist is about 14.12 fF, and the change amount of the capacitance may be about 30% of the capacitance when the touch does not exist, and as a result, the sensitivity of the sensor may be improved.

Figure 7:
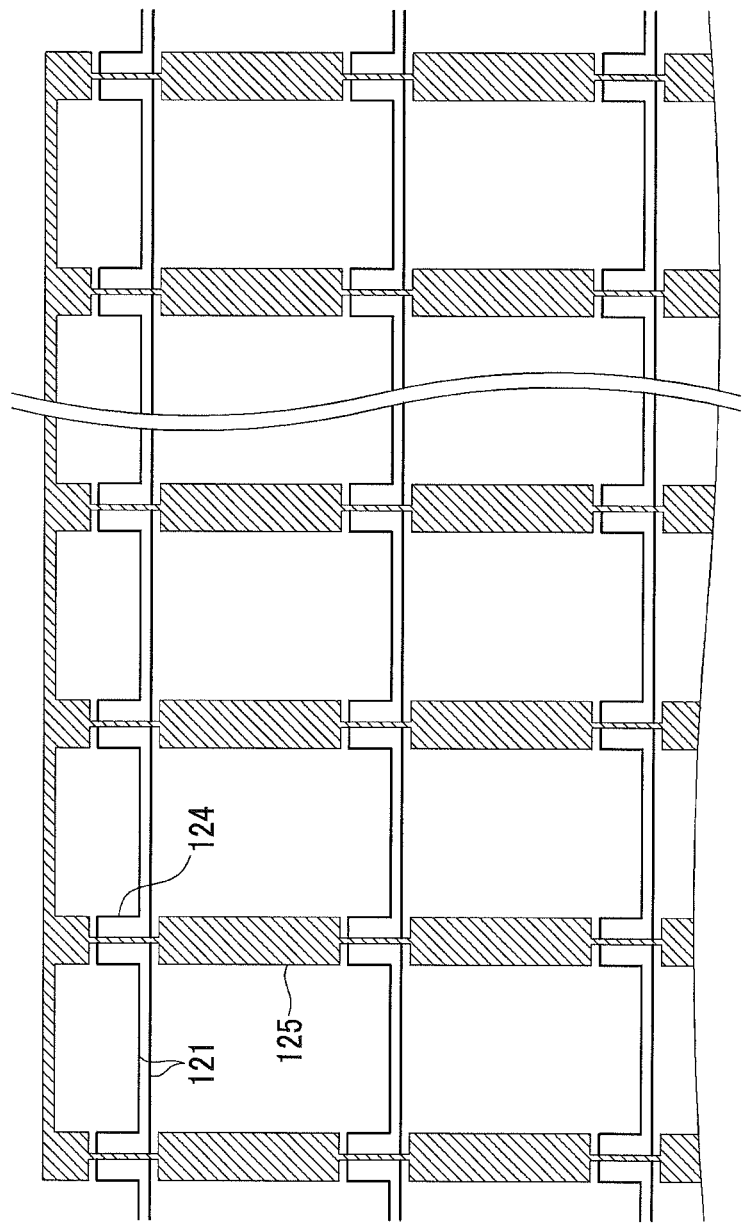
FIG. 7 is a top plan view of another exemplary embodiment of a touch sensor unit.

Referring to FIG. 7, in an exemplary embodiment, the sensing electrode 125 extends in the direction substantially perpendicular to the gate line 121, and in such an embodiment, the capacitance of the capacitor Cm when the touch does not exist is about 13.8 fF, the capacitance when the touch does exist is about 13.1 fF, and the change amount of the capacitance may be about 5% of the capacitance when the touch does not exist.

Hereinafter, an exemplary embodiment, in which the display panel assembly 300 is a liquid crystal panel, will be described with reference to FIG. 8. However, an exemplary embodiment of the display panel assembly 300 is not limited to the liquid crystal panel.

Figure 8:
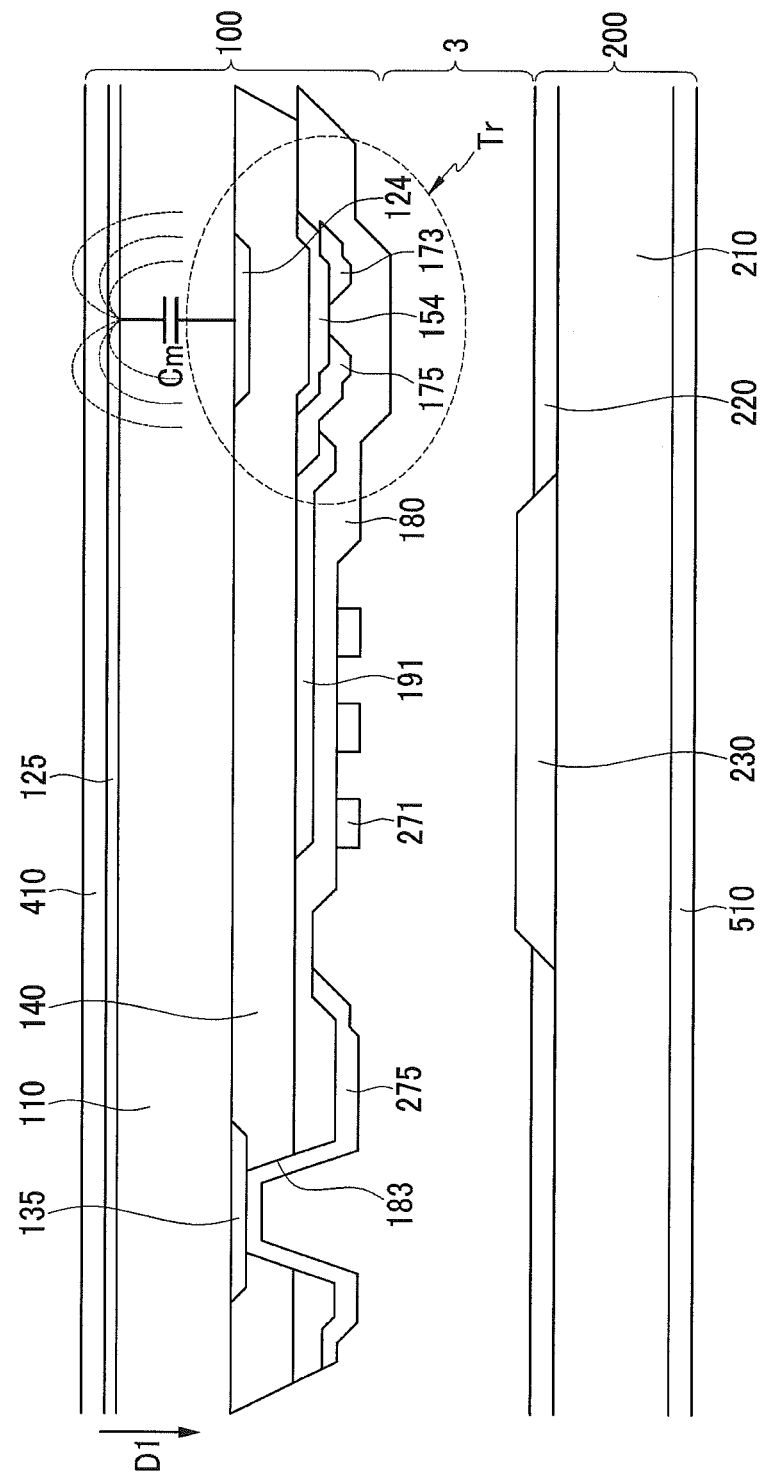
FIG. 8 is a cross-sectional view of an exemplary embodiment of a display device including a sensor according to the invention.

FIG. 8 is a cross-sectional view of an exemplary embodiment of a display device including a sensor according to the invention.

Referring to FIG. 8, an exemplary embodiment of the display device includes a first display panel 100, the second display panel 200, and a liquid crystal layer 3 between the first panel 100 and the second panel 200. In such an embodiment, a sensing electrode 125 is positioned at a first display panel 100 including a thin film transistor Tr, and defines the capacitance Cm along with the gate electrode 124. In an exemplary embodiment, the sensing electrode 125 includes a transparent conductive material, such as indium tin oxide ("ITO") and indium zinc oxide ("IZO"). In an exemplary embodiment, the sensing electrode 125 may have a single-layer structure. The first display panel 100 includes a substrate 110 including an insulator and positioned between the sensing electrode 125 and a gate electrode 124. In such an embodiment, the sensing electrode 125 may be positioned on the substrate 110 of the first display panel 100, an insulating layer (not shown) may be positioned on the sensing electrode 125, and the gate electrode 124 may be positioned on the insulating layer. In an exemplary embodiment, the sensing electrode 125 may be positioned on an outside surface of the substrate 110 of the first display panel 100. In an alternative exemplary embodiment, the sensing electrode 125 may be positioned an inside surface of the substrate 110 of the first display panel 100. The first display panel 100 may include a polarizer 410 positioned on the outside surface of the substrate 110 thereof.

The first substrate 110 of the first display panel 100 may include a material, such as transparent glass or plastic.

The first display panel 100 may include gate lines (not shown) including the gate electrodes 124 positioned on the substrate 110 thereof. The first display panel 100 may include a reference voltage line (not shown) including an expansion 135 for transmitting a constant reference voltage and for connection with reference electrodes 271 and 275, which is positioned at the same layer as the gate electrode 124.

In an exemplary embodiment, the gate line may include a material such as an aluminum-based metal of aluminum (Al) or aluminum alloys, a silver-based metal of silver (Ag) or silver alloys, a copper-based metal of copper (Cu) or copper alloys, a molybdenum-based metal of molybdenum (Mo) or molybdenum alloys, chromium (Cr), tantalum (Ta) or titanium (Ti), for example. In an exemplary embodiment, the gate line may have a multilayer structure including at least two conductive layers having different physical properties.

The reference voltage line may be substantially parallel to the gate line and may include the same material as the gate line.

The first display panel 100 may include a gate insulating layer 140 including a material, such as silicon nitride (SiNx) or silicon oxide (SiOx), for example, and positioned on the gate electrode 124 and the expansion 135 of the reference voltage line. The gate insulating layer 140 may have a multilayer structure including at least two conductive layers having different physical properties.

The first display panel 100 may include a semiconductor layer 154, e.g., a semiconductor island, including amorphous silicon or polysilicon on the gate insulating layer 140. The semiconductor island 154 overlaps at least a portion of the gate electrode 124.

The first display panel 100 may include a source electrode 173 and a drain electrode 175 facing each other and positioned on the semiconductor layer 154. The first display panel 100 may include a data line (not shown) on the gate insulating layer 140, electrically connected to the source electrode 173 and extending in a direction intersecting the gate line.

The data line transmits the data signal and extends substantially in a longitudinal direction and intersecting the gate line and the reference voltage line.

The gate electrode 124, the source electrode 173 and the drain electrode 175 collectively define the thin film transistor Tr along with the semiconductor layer 154, and a channel of the thin film transistor Tr is formed in the semiconductor layer 154 between the source electrode 173 and the drain electrode 175.

Ohmic contacts (not shown) may be disposed between the semiconductor layer 154 and the source electrode 173 and between the semiconductor layer 154 and the drain electrode 175. The ohmic contacts may include a material such as silicide or n+ hydrogenated amorphous silicon, in which an n-type impurity such as phosphorus is doped at a high concentration.

The first display panel 100 may include a pixel electrode 191 positioned on and overlapping a portion of the drain electrode 175 and the gate insulating layer 140. The pixel electrode 191 covers a portion of the drain electrode 175, and is physically and electrically connected to the drain electrode 175.

The pixel electrode 191 may include a transparent conductive material such as ITO or IZO.

The first display panel 100 may include a passivation layer 180 positioned on the source electrode 173, the drain electrode 175, the exposed semiconductor layer 154 and the pixel electrode 191. In an exemplary embodiment, the passivation layer 180 includes an inorganic insulator such as silicon nitride and silicon oxide. In an alternative exemplary embodiment, the passivation layer 180 may include an organic insulator and have a flat surface. In such an embodiment, the organic insulator may have photosensitivity. In one exemplary embodiment, for example, the dielectric constant of the organic insulator is less than or equal to about 4.0. In an exemplary embodiment, the passivation layer 180 may have a dual-layered structure of a lower inorganic layer and an upper organic layer such that the passivation layer 180 may not harm an exposed portion of semiconductor layer 154 while sustaining the insulation characteristics of the organic layer.

In an exemplary embodiment, a contact hole 183, which exposes the expansion 135 of the reference voltage line, is formed in the passivation layer 180 and the gate insulating layer 140.

The reference electrodes 271 and 275 are disposed on the passivation layer 180. The reference electrodes 271 and 275 overlap the pixel electrode 191, and include a plurality of branch electrodes 271 and a connection (not shown) that connects the plurality of branch electrodes 271. In an exemplary embodiment, the reference electrodes 271 and 275 include a transparent conductive material such as ITO and IZO. The reference electrodes 271 and 275 disposed in neighboring pixels are connected to each other.

In an exemplary embodiment, an alignment layer may be coated on the reference electrodes 271 and 275 and the passivation layer 180.

In an exemplary embodiment, when a direction of the lower surface of the first substrate 110 that is toward the outside is referred to as the first direction D1, the gate line including the gate electrode 124, the gate insulating layer 140, the semiconductor layer 154, the source electrode 173, and the drain electrode 175 are sequentially deposited according to the first direction D1.

The second display panel 200 includes a substrate 210 including transparent glass or plastic and a light blocking member 220 disposed on the substrate 210 thereof. The second display panel 200 includes a light blocking member 220 (also referred to as a black matrix) that prevents light leakage.

The second display panel 200 includes a plurality of color filters 230 disposed on the second substrate 210. A substantial portion of the color filters 230 are disposed in a region surrounded by the light blocking member 220, and may extend longitudinally along a row of the pixel electrodes 191. Each of the color filters 230 may have one of the three primary colors, e.g., red, green and blue.

In an exemplary embodiment, the second display panel 200 may include an overcoat (not shown) on the color filters 230 and the light blocking member 220. The overcoat may include an (organic) insulator, prevents the color filters 230 from being exposed, and provides a flat surface. In an alternative exemplary embodiment, the overcoat may be omitted.

In an exemplary embodiment, the second display panel 200 includes a polarizer 510 positioned on an outside surface of the substrate 210 thereof. In an alternative exemplary embodiment, the polarizer 510 may be omitted.

The pixel electrode 191 receives the data voltage from the drain electrode 175, and the reference electrodes 271 and 275 receive a reference voltage having a predetermined magnitude from the expansion 135 of the reference voltage line. The reference voltage is applied from a reference voltage application unit (not shown) disposed outside the display area, to prevent a voltage drop inside the display area, and the reference electrodes 271 and 275 are connected to each other, thereby receiving the reference voltage of the predetermined magnitude from the reference voltage line 131.

The pixel electrode 191 applied with the data voltage generates an electric field along with the reference electrode 271 applied with the reference voltage such that liquid crystal molecules of the liquid crystal layer 3 between the pixel and reference electrodes 191 and 271 rotate. Polarization of light that transmits through the liquid crystal layer may change based on the rotation direction of the liquid crystal molecules.

The pixel electrode 191 is disposed between the gate insulating layer 140 and the passivation layer 180 and covers a portion of the drain electrode 175 to be electrically and physically connected thereto, such that the aperture ratio is substantially increased.

In an alternative exemplary embodiment, at least one of the color filter 230 or the light blocking member 220 may be positioned in the first display panel 100.

According to exemplary embodiment of the invention as described herein, the sensitivity of the sensor is substantially improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
a first display panel including:
a thin film transistor comprising:
a gate electrode;
a source electrode;
a drain electrode; and
a semiconductor layer;
a gate line configured to transmit a gate signal to the gate electrode of the thin film transistor and extending in a first direction and a width of the gate line is varied along the first direction; and
a sensing electrode extending in the first direction and entirely overlapping the gate line along an entire length of the sensing electrode in the first direction, wherein a planar shape of the entire sensing electrode directly overlapping the gate line is substantially the same as the planar shape of the overlapped gate line and a size of the planar shape of the entire sensing electrode is larger than the corresponding planar shape of the entirely overlapped gate line in a plan view,
wherein the sensing electrode overlapping the gate electrode defines a capacitor;
a second display panel opposite to the first display panel; and
an electro-optical active layer between the first display panel and the second display panel; and
a touch signal processor configured to process a sensing signal outputted from the sensing electrode,
wherein the sensing signal is generated from the gate signal and transmitted through the capacitor.

2. The display device of claim 1, wherein the first display panel comprises:
a plurality of gate lines extending in the first direction; and
a plurality of sensing electrodes extending in the first direction,
wherein the number of the sensing electrodes is less than half the number of the gate lines.

3. The display device of claim 2, wherein the plurality of sensing electrodes comprises:
a first sensing electrode; and
a second sensing electrode neighboring the first sensing electrode,
wherein at least n gate lines of the gate lines are positioned between the first sensing electrode and the second sensing electrode, and
wherein n is a natural number.

4. The display device of claim 1, wherein
the sensing electrode is connected to a charge amplifier.

5. The display device of claim 4, wherein
the charge amplifier comprises:
a non-inversion terminal which is grounded;
an inversion terminal connected to the sensing electrode; and
an output terminal,
wherein a capacitor is connected between the inversion terminal and the output terminal.

6. The display device of claim 1, wherein
a plane shape of the gate line and the gate electrode is substantially the same as the plane shape of the sensing electrode.

7. The display device of claim 1, wherein
the sensing electrode comprises a transparent conductive material.

8. The display device of claim 7, wherein
the sensing electrode has a single-layer structure.

9. The display device of claim 1, wherein the first display panel comprises:
a plurality of gate lines extending in the first direction;
a plurality of sensing electrodes extending in the first direction; and
a sensing signal line connected to the plurality of sensing electrodes,
wherein the sensing signal line transmits a sensing signal, and
wherein the plurality of sensing electrodes are connected to each other by the sensing signal line.

10. The display device of claim 9, wherein
the first display panel comprises a plurality of touch sensor units disposed substantially in a matrix shape, and
the plurality of touch sensor units is connected to the sensing signal line.

11. The display device of claim 10, further comprising:
a touch signal processor configured to process the sensing signal,
wherein the touch signal processor is connected to the sensing signal line.

12. The display device of claim 1, wherein the sensing electrode extending in the first direction and overlapping the gate line extends along at least a substantial length of the gate line.

13. A display device comprising:
a plurality of gate lines configured to transmit a gate signal, wherein the plurality of gate lines comprises a plurality of gate electrodes, and the plurality of gate lines extends in a first direction; and
a touch sensor unit configured to capacitively sense a touch thereon, wherein the touch sensor unit comprises a plurality of sensing electrodes configured to define a plurality of capacitors along with the plurality of gate electrodes directly overlapped by respective sensing electrodes in which a planar shape of the entire respective sensing electrodes are larger than a corresponding planar shape of the entirely overlapped gate line along an entire length of the sensing electrodes extending in the first direction in a plan view, the touch sensor unit configured to process a sensing signal outputted from the sensing electrodes, wherein the sensing signal is generated from the gate signal and transmitted through the capacitors,
wherein the number of the plurality of sensing electrodes is less than half the number of the plurality of gate lines.

14. The display device of claim 13, wherein the plurality of sensing electrodes comprise:
a first sensing electrode; and
a second sensing electrode neighboring the first sensing electrode,
wherein at least n gate lines are positioned between the first sensing electrode and the second sensing electrode, and
wherein n is a natural number.

15. The display device of claim 13, wherein
the plurality of sensing electrodes comprises a transparent conductive material.

16. The display device of claim 15, wherein
each of the plurality of sensing electrodes has a single-layer structure.

17. The display device of claim 13, wherein
the plurality of sensing electrodes is connected to each other by a sensing signal line.

18. The display device of claim 17, further comprising:
a touch signal processor configured to process a sensing signal transmitted through the sensing signal.

19. The display device of claim 13, wherein the sensing electrode extending in the first direction and overlapping the gate line extends along at least a substantial length of the gate line.

* * * * *